STRAPLESS SLIP

Original Filed July 28, 1950 2 SHEETS—SHEET 1

INVENTOR.
SYLVIA ROODNER
BY Mock + Blum
ATTORNEYS.

STRAPLESS SLIP

Original Filed July 28, 1950 2 SHEETS—SHEET 2

INVENTOR.
SYLVIA ROODNER
BY Mock + Blum
ATTORNEYS

Reissued Aug. 5, 1952

Re. 23,533

UNITED STATES PATENT OFFICE 23,533

STRAPLESS SLIP

Sylvia Roodner, New York, N. Y.

Original No. 2,545,109, dated March 13, 1951, Serial No. 176,374, July 28, 1950. Application for reissue April 28, 1951, Serial No. 223,471

5 Claims. (Cl. 2—73)

Matter enclosed in heavy brackets [ ] appears in the original patent but forms no part of this reissue specification; matter printed in italics indicates the additions made by reissue.

This invention relates to a new and improved strapless slip.

Its principal object is to provide a strapless slip having a self-supporting bodice or brassière section of novel construction.

Another object of the invention is to provide an improved self-supporting bodice section made from elastic fabric, which will comfortably hug the body of the wearer, thereby eliminating the necessity of shoulder straps.

Still another object of the invention is to provide an improved self-supporting bodice section for slips, having good bust supporting qualities.

Other objects of the invention will be set forth in the following description and annexed drawings, which illustrate preferred embodiments thereof.

Figure 6:
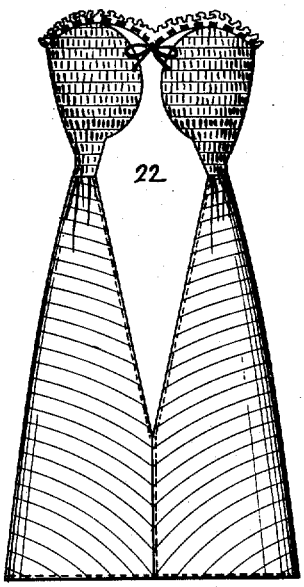
Fig. 6 is a front elevational view, similar to Fig. 1, but showing a slight modification in the construction of the frontal insert of the garment.

Referring to Figs. 1 to 5 of the drawings, the improved strapless slip comprises a bodice or brassière section 10 and a depending skirt section 11, connected to each other at the waistline W of the garment.

Bodice section 10 is composed of a single piece of elastic woven puckered fabric E and the front bust separating insert 12. The said elastic section E extends around the back of bodice 10 to form the rear portion 13 thereof, and into the front of the said bodice to form the spaced complementary bust supporting portions 14.

Figure 1:
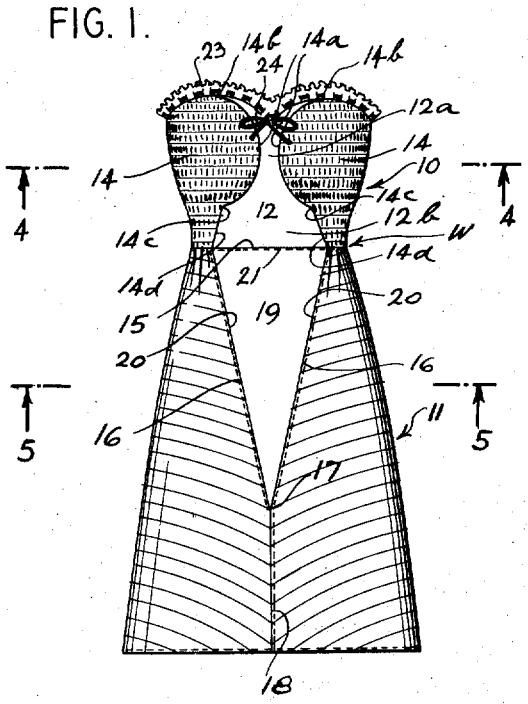
Fig. 1 is a front elevational view of a strapless slip embodying the invention herein.
Figure 2:
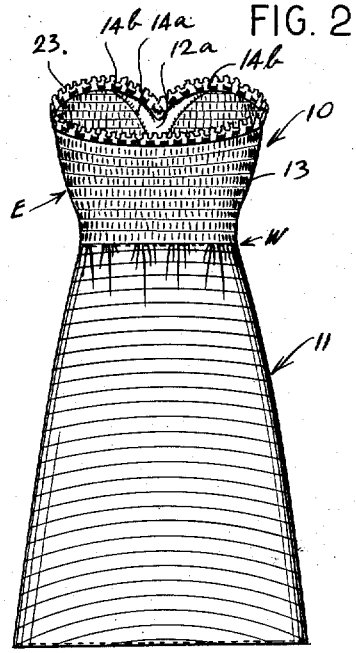
Fig. 2 is a rear elevational view of the slip shown in Fig. 1.
Figure 3:
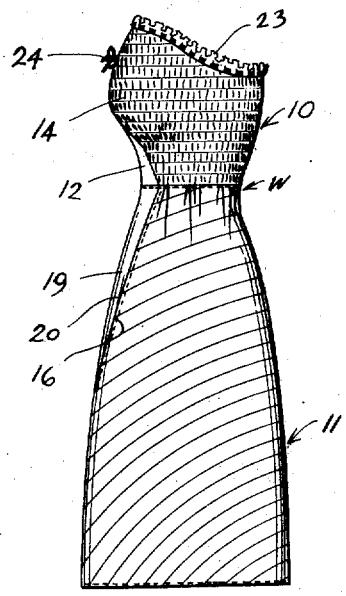
Fig. 3 is a side elevational view of said slip.

As clearly shown in Fig. 1, elastic panel E is cut, to present at the front of bodice 10, a pair of spaced adjacent convex edges 14a, each of said curved edges extending from an upper point 14b to the lower point 14c. From each said point 14c, each of the said edges 14a tapers outwardly at 14d down to the waistline W of the garment. The edges 14a are so cut as to follow the junction line of the breasts.

Figure 4:
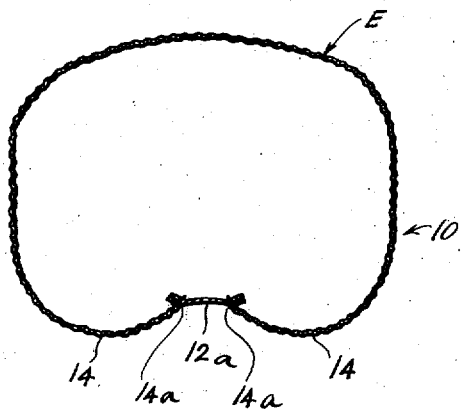
Fig. 4 is a sectional view on the line 4—4 of Fig. 1.
Figure 5:
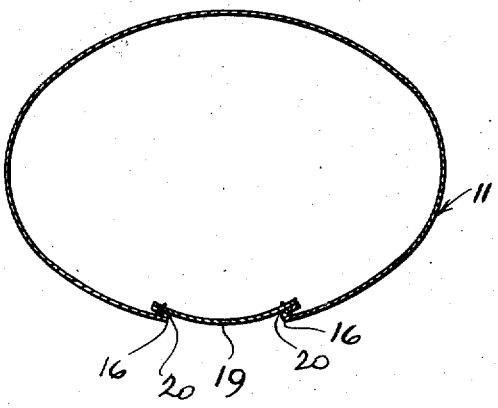
Fig. 5 is a sectional view on the line 5—5 of Fig. 1.

Positioned intermediate the said edges 14a and 14d of bodice panel E and stitched thereto is the fabric bust separating insert 12. The said insert has a relatively narrow upper portion 12a and a flared wide lower portion 12b, the edges of the said upper portion being concavely cut to conform to convex edges 14a of bodice panel E, the side edges of the lower portion 12b being angularly cut to mate with inclined edges 14d of said panel E. Fig. 4 shows the stitching of the side edges of front insert 12 to the adjacent edges of panel E. The said front insert has a lower edge 15 which is located at the waistline W of the garment.

The invention herein resides in the self-supporting bodice portion 10 of the garment, which construction permits full and good support of the bust, and eliminates the necessity of shoulder straps. The upper portion 12a of front insert 12 acts as a bust separating member, and the resilient bust supporting portions 14 serve as bust cups to firmly hold the bust.

The construction of skirt section 11 is shown in my U. S. Patent No. 2,470,901. Briefly, the said skirt is cut from a single blank of material to present at the front thereof a pair of upwardly divergent edges 16 extending from a point 17 above the lower edge of said skirt to the waistline W of the garment. The edges below said point 17, at the meeting of said edges 16, are substantially vertical and are stitched to each other by the vertical line of stitching 18.

Skirt 11 also includes a frontal insert 19, which has a pair of upwardly divergent edges 20 and a top edge 21, the said insert being of inverted isosceles triangular configuration. The said insert 19 is united with skirt 11 by stitching each of said edges 20 to a respective divergent edge 16 of said skirt. Top edge 21 of said insert 19 is stitched to lower edge 15 of the bodice insert 12 at the waistline W of the garment.

Fig. 6 shows a slight modification in that the bodice insert and the skirt insert are integral, instead of being separate members and then stitched together. The said integral insert has been indicated by the reference numeral 22.

The upper portion of the improved slip may be ornamented with a ruffle 23 and a bow 24.

There has been illustrated and described a preferred embodiment of the invention, but it is obvious that numerous changes and omissions may be made without departing from its spirit.

What is claimed is:

1. A strapless slip comprising a bodice section and a depending skirt section connected to each other about the waistline of the garment, said bodice section consisting of an elastic panel and a non-elastic front bust separating insert, the said elastic panel extending around the back of the bodice section to form the rear part thereof and into the front of the said bodice to form a pair of spaced and complementary bust supporting members, the said elastic panel being cut to present at the front of the bodice section a pair of spaced curved convex edges to follow the junction line of the breasts, the said curved convex edges tapering outwardly from the lower point thereof to the waistline of the slip, the front bust separating insert being stitched to said curved and angular edges, the said insert having a relatively narrow upper portion and a flared wide lower portion, the side edges of said upper portion being concavely cut and being stitched to the front curved convex edges of the elastic panel, the side edges of the lower portion of said insert being angularly cut and being stitched to the front angular edges of said elastic panel.

2. A strapless slip garment comprising a bodice section and a depending skirt section connected to each other at the waistline of the garment, said bodice section consisting of a rear portion and a pair of spaced front bust supporting members, the said rear portion and bust supporting members being made of elastic material, each of said bust supporting members having adjacent and spaced curved convex edges to follow the junction line of the breasts, the said curved convex edges tapering from the lower point thereof to the waistline of the garment, a front bust separating insert positioned intermediate said bust supporting members, the said insert having a relatively narrow upper portion and a flared wide lower portion, the side edges of said upper portion being concavely cut and being stitched to the curved convex edges of the bust supporting members, the side edges of the lower portion of said insert being angularly cut and being stitched to the lower angular edges of said bust supporting members.

*3. A strapless slip garment comprising a bodice section and a depending skirt section connected to each other at the waistline of the garment, said bodice section comprising a rear portion and a pair of spaced front bust supporting members, each of said bust supporting members having adjacent and spaced curved convex edges and with laterally tapering edges extending from said curved edges to the waistline of the garment, a front bust separating insert positioned intermediate said bust supporting members, the said insert having a relatively narrow upper portion and a flared wide lower portion, said upper portion having opposite side edges concavely cut and being secured to the curved convex edges of the bust supporting members, the side edges of the lower portion of said insert being angularly cut and being secured to the lower tapering edges of said bust supporting members.*

*4. A strapless slip garment comprising a bodice section and a depending skirt section connected to each other at the waistline of the garment, said bodice section comprising a rear portion and a pair of spaced front bust supporting members attached directly to the skirt section throughout the width of the lower portions of the bust supporting members, each of said bust supporting members having adjacent and spaced curved convex edges and with appreciably wider spaced lower edges below said curved convex edges, a front bust separating insert positioned intermediate said bust separating members, the said insert having a relatively narrow upper portion and a wide lower portion with side edges of said upper portion concavely cut and being secured to the curved convex edges of the bust supporting members and with side edges of the lower portion of said insert secured to the lower edges of said bust supporting members.*

*5. A strapless slip garment comprising a bodice section and a depending skirt section connected to each other at the waist line of the garment, said bodice section comprising a rear portion and a front portion including a pair of spaced front bust supporting members attached directly to the skirt section throughout the width of the lower portions of the bust supporting members, at least one of said portions being made of elastic material, each of said bust supporting members having adjacent and spaced curved convex edges at an upper portion thereof and having appreciably wider spaced divergent lower edges below said curved convex edges, a front bust separating insert positioned intermediate said bust supporting members, said insert having a relatively narrow portion and an appreciably wider lower portion with side edges of said upper portion concavely cut and secured to the convex edges of the bust supporting members and with side edges of the lower portion of said insert secured to the diverging lower edges of said bust supporting members.*

SYLVIA ROODNER.

REFERENCES CITED

The following references are of record in the file of this patent or the original patent:

UNITED STATES PATENTS

| Number | Name | Date |
|---|---|---|
| 2,127,366 | Mele | Aug. 16, 1938 |
| 2,315,975 | Malmstead | Apr. 6, 1943 |
| 2,470,901 | Roodner | May 24, 1949 |
| 2,516,426 | Schimmel | July 25, 1950 |

FOREIGN PATENTS

| Number | Country | Date |
|---|---|---|
| 801,201 | France | May 16, 1936 |